United States Patent [19]

Bourrain et al.

[11] 4,157,420
[45] Jun. 5, 1979

[54] ADHESIVE-COATING GLASS FIBERS AND THE RESULTING COATED FIBERS

[75] Inventors: Paul Bourrain, Ecully; Pierre Giroud, La Verpillere, both of France

[73] Assignee: Rhone-Poulenc-Textile, Paris, France

[21] Appl. No.: 821,175

[22] Filed: Aug. 2, 1977

[30] Foreign Application Priority Data

Aug. 4, 1976 [FR] France ............... 76 24021

[51] Int. Cl.² ................ B23B 9/00; D02G 3/00
[52] U.S. Cl. .................... 428/392; 427/57; 427/385 A; 427/434 D; 260/29.3; 428/388
[58] Field of Search .......... 427/434 D, 434 R, 434 E, 427/385 A, 390 A, 346, 57, DIG. 8; 428/392; 260/29.3

[56] References Cited

U.S. PATENT DOCUMENTS

| 2,694,307 | 11/1954 | Henry ..................... 68/43 |
| 3,084,020 | 4/1963 | Loosli ..................... 8/130.1 |
| 3,269,841 | 8/1966 | Dechaine et al. .......... 99/14 |
| 3,314,356 | 4/1967 | Dechaine et al. .......... 99/234 |
| 3,533,830 | 10/1970 | Marzocchi ................ 260/29.3 |
| 3,597,379 | 8/1971 | Van Valkenburg ......... 260/29.3 |
| 3,619,252 | 11/1971 | Roscher ................... 428/392 |
| 3,620,701 | 11/1971 | Janetos et al. ............. 260/29.3 |
| 3,740,257 | 6/1973 | Roscher ................... 427/385 A |
| 3,796,627 | 3/1974 | Marzocchi ................ 427/385 A |
| 3,814,713 | 6/1974 | Honda et al. .............. 260/29.3 |
| 3,840,426 | 10/1974 | Flautt et al. .............. 428/428 |
| 3,870,551 | 3/1975 | Iwami et al. .............. 427/434 D |
| 3,969,299 | 7/1976 | Burns et al. .............. 427/269 |

FOREIGN PATENT DOCUMENTS

| 1011301 | 6/1952 | France ..................... 68/43 |
| 2093277 | 1/1972 | France ..................... 428/392 |
| 1288632 | 9/1972 | United Kingdom ........ 428/392 |

*Primary Examiner*—Michael F. Esposito
*Assistant Examiner*—Sadie L. Childs
*Attorney, Agent, or Firm*—Stevens, Davis, Miller & Mosher

[57] ABSTRACT

A new process of adhesive-coating which makes it possible to increase the adhesion of glass fibers to rubbers based on natural rubber. The fibers are impregnated by means of a composition consisting or consisting essentially of a solution containing a resorcinol/formaldehyde resin, a natural latex, a latex based on vinylpyridine and, preferably, ammonium hydroxide, and while passing through the coating bath they are subjected to vibratory movements communicated directly to the fibers. The glass fibers adhesive-coated in this way are of great interest to the rubber industry in the manufacture of tires, conveyors, conveyor belts, hoses and the like.

4 Claims, 2 Drawing Figures

ADHESIVE-COATING GLASS FIBERS AND THE RESULTING COATED FIBERS

The present invention relates to a new process of adhesion-coating which is very easy to use and which makes it possible to increase the adhesion of glass fibers to rubbers based on natural rubber, and to the glass fibers thus obtained.

The glass fibers thus obtained are intended for the reinforcement of rubber articles based on natural rubber.

The term "rubbers based on natural rubber" is to be understood as meaning rubbers containing from 40 to 100% of natural rubber, in which the other constituents can be, for example, synthetic polyisoprene, a butadiene/styrene copolymer, or polybutadiene.

By the term "glass fibers" used throughout the present application is to be understood as meaning:

(1) Continuous filaments produced by the rapid drawing-down of the desired number of molten glass strands and assemblies of glass fibers formed when continuous glass filaments are assembled, as well as yarns and cords of yarns formed by twisting, doubling or interlacing of a certain number of strands, and also the woven and non-woven fabrics which are formed of such strands, yarns or cords of glass fibers;

(2) Discontinuous glass fibers and spun yarns consisting of such discontinuous fibers, and woven and non-woven fabrics formed of such discontinuous fibers or spun yarns; or (3) Combinations of continuous glass filaments and discontinuous glass fibers in the form of yarns, spun yarns, cords and fabrics.

As is well known, yarns intended for reinforcing rubber articles adhere only weakly to the latter and they must be subjected to a special treatment if it is desired to obtain good adhesion between the yarns and the rubber. For this purpose, the yarns are passed through a bath containing a dispersion of latex and of various prepolymerised resins after which the yarns are drained, dried and subjected to a high temperature which completes the polymerisation and the fixing of the adhesive composition to the yarns.

However, when yarns of high gauge and consisting of several hundreds of filaments are passed in this way through an adhesive-coating bath their depth impregnation is incomplete. Now whilst depth impregnation is not usually sought in the customary rubber reinforcement uses in the case of rayon, polyamide or polyester yarns, it is, in contrast, essential and fundamental in the case of glass yarns. In fact, in order to make it possible for glass yarns consisting of a large number of continuous filaments to be used advantageously for the reinforcement of articles of rubber or other elastomers, it is necessary that the filaments should all be coated individually with a sheath of elastomer so as to avoid abrasion effects between adjacent filaments. Insufficient depth impregnation in such a case constitutes a serious disadvantage.

French Application No. 2,051,577 (published Apr. 9, 1971), corresponding to British Patent Specification No. 1,288,632, has already disclosed a bath of the following composition:

| resorcinol/formaldehyde resin | 26.7 | parts by weight |
|---|---|---|
| 37% strength formaldehyde | 13.5 | " |
| NaOH | 8.0 | " |
| vinylpyridine terpolymer | 50.0 | " |
| butadiene/styrene copolymer latex (40% strength) | 150.0 | " |
| natural rubber latex | 50.0 | " |
| water | 540.5 | " | whilst U.S. Pat. No. 3,870,551 discloses a bath of the following composition:

| resorcinol | 2.03 | parts by weight |
|---|---|---|
| formaldehyde | 2.63 | " |
| NaOH (10% strength) | 2.00 | " |
| styrene/butadiene/vinylpyridine terpolymer latex (41% strength) | 9.77 | " |
| butadiene/styrene copolymer latex (39% strength) | 10.25 | " |
| natural rubber latex | 13.35 | " |
| water | 59.97 | " |

However, these two patents relate to higher resin/solids and vinylpyridine latex/total latex ratios than those of the present application, which increases the rigidity of the adhesive-coated articles, whilst the natural latex/total latex ratio is, in contrast, less than that of the present application, which has the effect of reducing the "tack". Furthermore, the presence of styrene/butadiene latex increases the cost of such baths.

French Pat. No. 1,567,992 describes an adhesive-coating bath of the following composition:

| resorcinol | 352 | parts by weight |
|---|---|---|
| aqueous formaldehyde solution (37% strength) | 518 | " |
| NaOH | 9.6 | " |
| butadiene/styrene/vinylpyridine terpolymer latex (Gen-Tac, 41% solids in water) | 7,800 | " |
| NH$_4$OH (28% strength) | 362 | " |
| H$_2$O | 9,572 | " |

However, such a bath does not contain natural rubber, which tends to reduce the tack and excessively to increase the rigidity.

Furthermore, processes for the treatment of yarns, fibers and slivers in an impregnation bath are known, in particular from French Pat. Nos. 1,011,301, 1,205,142 (corresponding to U.S. Pat. No. 3,084,020) and 1,391,181 (corresponding to U.S. Pat. Nos. 3,269,841 and 3,314,356), which consist of vibrating the treatment bath, the vibrations being transmitted to the product to be treated. The filaments or fibers of which the product consists are separated by the vibratory action, which favors the depth-penetration of the treatment bath.

Finally, from Belgian Pat. No. 502,231 (corresponding to U.S. Pat. No. 2,694,307) a process for dyeing in a bath is known, the desired penetration of the bath being effected by causing the yarns to undergo movement.

The present invention relates to a new process for adhesion-coating, characterised in that the fibers are impregnated with a composition consisting of a resin solution A produced from:

| softened water | 433 parts by weight |
|---|---|
| resorcinol | 36.6 parts by weight |
| sodium hydroxide | 1 to 3.50 parts by weight |
| 40% strength formaldehyde | 21.3 to 50.0 parts by weight | and a latex solution B composed of:

| | |
|---|---|
| softened water | 0 to 292 parts by weight |
| 60% strength natural latex | 213 to 428 parts by weight |
| 40% strength latex based on vinylpyridine | 640 to 960 parts by weight | in which:
- the total weight of solids relative to the bath varies between about 30 and 35%,
- the formaldehyde/resorcinol molar ratio varies between 0.85 and 2,
- the dry weight of latex relative to the resorcinol/formaldehyde resin varies between about 8.5/1 and 11/1,
- the final pH is 9.6±0.2, and
- the proportion by weight of dry resorcinol/formaldehyde resin relative to the amount of all the products varies between 10 and 12%, and in that the fibers passing through the bath are subjected to vibratory movements communicated directly to the fibers.

Preferably, there is used, conjointly with the solution of resin A, a latex solution C composed of:

| | | | | |
|---|---|---|---|---|
| water | 0 | to | 292 | parts by weight |
| 60% strength natural latex | 213 | to | 428 | parts by weight |
| 28% strength ammonium hydroxide | 2.6 | to | 10.5 | parts by weight |
| latex based on vinylpyridine | 640 | to | 960 | parts by weight |

The present invention also relates to the glass fibers adhesive-coated by means of the said adhesive-coating compositions.

The adhesive-coating composition for glass fibers described above is used for adhesion to rubbers based on natural rubber.

By latex based on vinylpyridine there is to be understood a styrene/butadiene/vinylpyridine terpolymer commercially available under the trade-name "GENTAC" (General Tire and Rubber Company) or UGITEX V.P. (Rhone-Poulenc).

Solution A, the various components of which are introduced in the precise order indicated above, is stirred at 20°±2° C. for a few hours to ripen the resin. The final pH, after ripening, must be 9±0.5.

The latex solutions B and C into which the components are also introduced in the above-mentioned order, are also prepared whilst stirring.

Solution A is then poured into solution B or C whilst stirring at ambient temperature; the final compositions have a pH of 9.6±0.2.

The actual adhesive-coating compositions according to the present invention are left to stand for 24 hours so as to obtain, after the subsequent treatment, an optimum result in respect of the mechanical and physical characteristics of the adhesive-coated glass fibers.

The adhesive-coating composition consisting or consisting essentially of a resin solution A and a latex solution B must be used within about 24 hours after its period of standing. During these approximately 24 hours, it retains a stable viscosity as well as good mechanical stability, that is to say it does not tend to coagulate whilst the glass fibers are passing over the draining roller, which is equipped with a wiper blade to remove the excess bath.

The adhesive-coating composition consisting or consisting essentially of solution A and solution C has the advantage over the earlier composition in that it can be stored for about 15 days at ambient temperature after its preparation; that is to say, it retains a stable viscosity and good mechanical stability for about 15 days.

It is possible to vary the proportion by weight of dry resorcinol/formaldehyde resin relative to the total amount of all solids contained in the bath. This ratio varies between 10 and 12%.

It is also possible to vary the molar ratio of formaldehyde to resorcinol between 0.85 and 2.

The ratio of the total weight of solids contained in the adhesive-coating bath to the total weight of the bath obtained can vary between about 30 and 35%.

The ratio of latex solids to resorcinol-formaldehyde resin solids can vary between about 8.5/1 and 11/1.

With the process according to the present invention, it becomes possible completely and homogeneously to impregnate coarse glass yarns consisting of several hundreds of filaments, even if these yarns have been given a slight twist beforehand. The said twist, which is inversely proportional to the square root of the gauge, can range up to 40 turns/meter for a gauge of 680 dtex and up to 15 turns/meter for a gauge of 3,400 dtex. Preferably, 25 turns/meter are used per 680 dtex and 10 turns/meter per 3,400 dtex.

The frequency of the vibrations is preferably of the order of 50 Hertz, regardless of the gauge of the glass yarns treated. This process makes it possible to achieve the desired result whilst using much simpler apparatus than that employed in the case where the bath itself is caused to vibrate.

The invention can be carried out by means of a device comprising a vibrating element immersed in the bath in contact with the glass yarn or yarns and transmitting the vibratory movement to the said yarns while immersed in the bath. The vibrating element preferably consists of a pressure bar for the yarn or yarns, connected to a vibration-generating device. Where the treatment is carried out by the usual method, according to which the yarns are in the form of a web, the vibrating element may consist of a bar which presses onto all the yarns. The vibration-generator is preferably mechanical or electromagnetic. It can comprise, for example, a vibrating motor connected rigidly to the pressure bar, the combination of bar, connection and motor being held in position by an elastic mounting.

After passing through the adhesive-coating bath, which is kept at ambient temperature, the glass fibers are drained in order to render the coating layer uniform, and are then dried at a temperature which depends on the speed of advance of the yarn (but which is at least 100° C.) using any appropriate device such as an oven and the like, after which they are again heat-treated at a higher temperature, generally above 180° C., to bring about the crosslinking of the resin.

The cords thus treated are generally wound up or doubled directly after the crosslinking treatment.

The adhesive-coating process according to the present invention possesses advantages which are particularly valuable to the user. For example, it makes it possible to obtain yarns having great flexibility, good adhesion (test H, described below) and unaltered tensometric properties (breaking load, tenacity and elongation at break), and good resistance to fatigue (Mallory test);

the percentage of coating of the bath on the yarns is greater than that which is obtained without a vibratory device;

the yarns have good "tack" towards one another. The "tack" is the property possessed by the yarns of sticking slightly to one another and to the unvulcanised rubber used, which makes it possible, inter alia, to wind and unwind the yarns easily and have a good hold of the yarn on the bobbins, by keeping the turns contiguous in the same layer whilst causing them to stick to one another from one layer to the next.

The invention will be still better understood with the aid of the following working examples and the accompanying drawings which are given by way of illustration but without implying any limitation on the invention.

Figure 1:
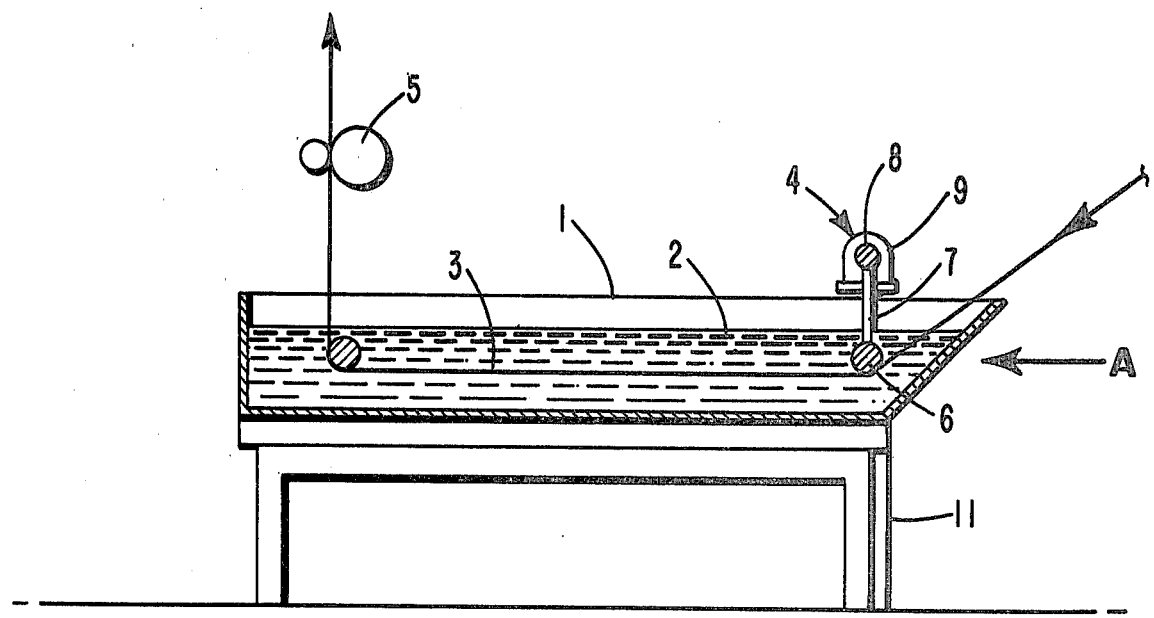
FIG. 1 represents an adhesive-coating trough in which is installed the device described above.

More precisely, FIG. 1 represents an adhesive-coating trough 1, filled with an adhesive-coating bath 2 according to the invention, through which a web of parallel yarns 3 travels. The web of yarns first passes under a vibrating unit 4 and then through a draining system 5, and thereafter travels vertically towards a drying and polymerisation column (not shown).

Figure 2:
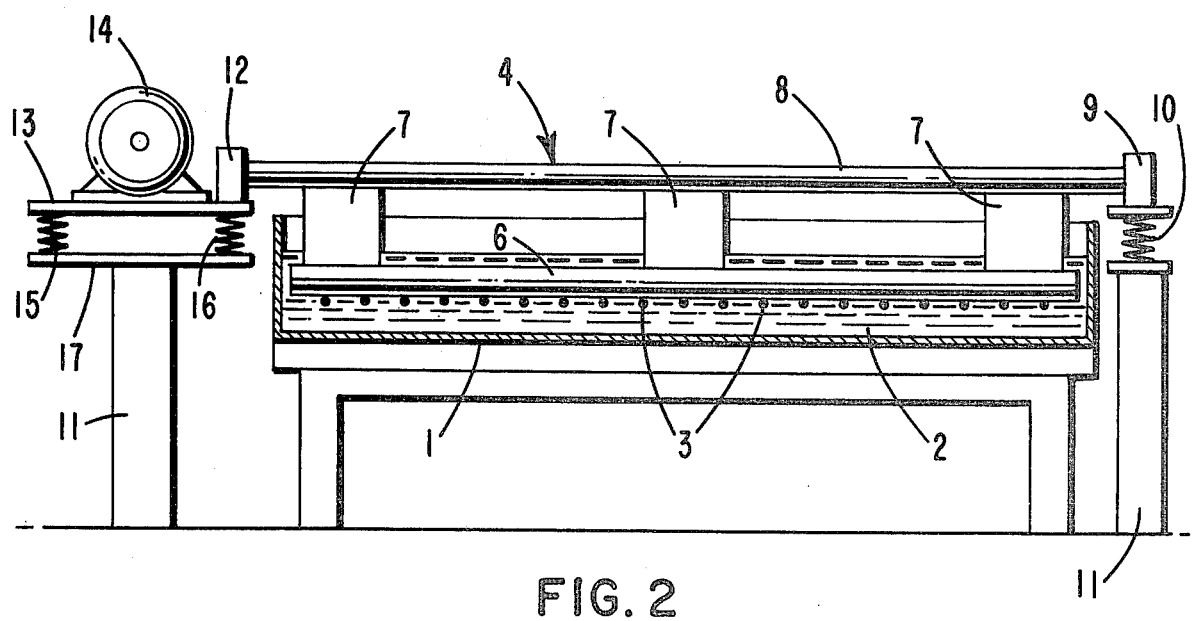
FIG. 2 is a view looking in the direction A of FIG. 1 with trough 1 shown in section.

The vibrating unit 4, represented more fully in FIG. 2, is of the mechanical type. It essentially comprises a horizontal bar 6 fixed by struts 7 to a parallel tube 8. This tube 8 is supported at one of its ends by a bearing 9 and by a spring 10 fixed to a framework 11, whilst it is supported at its other end by a bearing 12 subjected to the movement of a plate 13 to which an asynchronous motor 14 is firmly fixed. The plate 13 is itself supported by springs 15 and 16 fixed by means of a supporting plate 17 to another framework 11.

The axle of the asynchronous motor 14 carries two inertia blocks (not shown) which can be oriented with respect to one another by means of adjustment notches. The non-diametrical arrangement of these inertia blocks imparts to the assembly of the motor 14 and the plate 13, and hence to the tube 8 and the bar 6, a vibratory movement which depends on the frequency of the current used.

The draining system 5 is provided with a conventional wiper blade (not shown) intended to avoid any soiling of the draining roller.

In the examples which follow, the parts are to be understood as being by weight. The various tests are carried out as follows:

Adhesion test or test H

This evaluates the adhesion to the rubber of the adhesive-coated glass cords. The two ends of the cord to be examined are embedded in two blocks of natural rubber which is then vulcanised. The sample is in the shape of an H.

A sample of rubber of the following composition by weight is vulcanised at 145° C. for 30 minutes:

| | | |
|---|---|---|
| smoked sheet | 100 | parts |
| EPC carbon black | 43 | parts |
| zinc oxide | 5 | parts |
| stearic acid | 2 | parts |
| pine tar | 2 | parts |
| antioxidant MC (phenyl-β-naphthyl-amine) | 1 | part |
| "201 RP" rapid accelerator (dibenzothiazyl disulphide) | 1 | part |
| sulphur | 3 | parts |

The rubber thus prepared has the following characteristics:

| | |
|---|---|
| tenacity in kg/cm$^2$ | 220 |
| elongation at break | 554% |
| modulus at 300% in kg/cm$^2$ | 76 |
| Shore hardness | 61 | and after being left at rest for 24 hours the adhesion H is determined.

The Mallory fatigue test, carried out in accordance with a method based on standard specification ASTM D 885, is carried out as follows:

The sample consists of a hollow rubber cylinder in which are embedded adhesive-coated glass cords in the form of a web, forming an angle of 23° relative to the generatrix of the cylinder. The number of cords per meter constituting the web depends on the construction of the cords tested.

The rubber cylinder is bent at an angle of 90°, fixed at each end, placed under an air pressure of 3.5 kg/cm$^2$, and then caused to rotate at 850 rpm.

During the rotation, the glass cords are successively subjected to compressive and tensile stresses.

The fatigue resistance is determined by the number of cycles necessary to cause the sample to burst.

The breaking load is measured by means of a "Lhomargy" pendulum tensometer. The measurement is carried out on an anhydrous sample of 92 cm length between the jaws (axial spacing between the two pulleys 25 cm), after drying at 107° C.±2° C. for at least 3 hours or 135° C. for 30 minutes, the sample being mounted under a standard pre-tension (a tension corresponding, to within ±10%, to the weight of 500 m of nominal gauge of the material examined).

The total time of the operation, that is to say the time which elapses between the instant that the yarn issues from the oven and the instant of break, does not exceed 40 seconds, and the period for which it is placed under load, between the start of traction and the instant of break, is 9±1 seconds.

EXAMPLE 1

A web of glass yarn assemblies is subjected to an adhesive-coating treatment according to the process of this invention. Each assembly consists of 5 yarns of 680 dtex and 408 filaments which are not twisted together but are twisted individually with a pre-twist of 25 turns per meter. The 5 yarns are arranged side by side, in parallel within each assembly.

The web of non-twisted assemblies 3 passes through a comb which carries out a slow transverse reciprocating movement, and then enters the adhesive-coating bath 2, passing under the vibrating bar 6 which is subjected to a vibratory movement of 50 cycles/second, that is to say 3,000 cycles/minute. The yarns, which are initially grouped, at the instant at which they arrive under the bar 6, separate markedly thereafter, during their travel between the vibrating unit 4 and the draining device 5; within each yarn, the filaments "open".

The optimum amplitude of the vibrations is between 1.5 and 2 mm. The web of assemblies travels horizontally over a distance of 50 cm, at a depth of immersion in the bath of 5 cm, passes through the draining system, and then rises directly on a vertical path through a drying and polymerisation column.

Adhesive-coating bath used: a resin solution A containing the following is prepared:

| | |
|---|---|
| softened water | 433 parts |
| resorcinol | 36.6 parts |
| sodium hydroxide | 1.03 parts |
| 40% strength formaldehyde | 50 parts |

The various components are introduced, whilst stirring at 20° ±1° C., in the order indicated above, and the solution thus obtained is kept stirred for 4 hours and 30 minutes at 20° C.±1° C. in order to ripen. After ripening, 2.3 parts of sodium hydroxide are added.

Separately, a latex solution B consisting of:

| | |
|---|---|
| softened water | 292 parts |
| 60% strength natural latex | 428 parts |
| 40% strength latex based on vinyl-pyridine | 640 parts | is prepared whilst stirring at 20° C.±1° C.

Solution A is then poured into solution B whilst stirring at ambient temperature and the solution thus obtained is left standing for 24 hours. The pH of the adhesive-coating bath thus prepared is 9.6. The temperature of the bath is of the order of 15° to 20° C. The tension during adhesive-coating is 15 to 20 g for each yarn, that is to say 75 to 100 g for each assembly of 5 yarns. In the column, drying is carried out at 160° C. over a distance of 15 meters, and polymerisation at 190° C. over a distance of 30 meters. On leaving the column, the assemblies are collected on bobbins and then doubled at 110 turns/meter to form doubled yarns, and three of these latter are twisted together at 90 turns/meter in the opposite direction.

Comparative experiments with and without use of the vibrating bar show that the amount of adhesive-coating agent which is deposited on the assemblies varies depending on whether or not the vibratory device is used.

The characteristics of the "680×5×3/Z110/S90" cords, with or without use of the vibrating bar, are as follows:

| | Without Vibrations | With Vibrations |
|---|---|---|
| % of adhesive-coating composition fixed to the cords | 14 | 18 |
| penetration (% filling of the void spaces in cross-section) | 85 | 100 |
| adhesion H (measured on a sample 5 mm high) | 10 kg | 11.5 kg |
| fatigue (Mallory 1-ply test), number of cycles | conventional base 100 | 140 |

The above table shows the advantages of the present invention. In particular, it is observed that with the vibrating bar in operation, a deposit of 18% of solids is obtained, whilst in the absence of the vibrating bar the deposit is only 14% (relative to the weight of the assemblies). These advantages are achieved with a process which can be carried out with a simple device which is thus of low cost and functions reliably.

EXAMPLE 2

A resin solution A containing the following is prepared:

| | |
|---|---|
| softened water | 433 parts |
| resorcinol | 36.6 parts |
| sodium hydroxide | 1.03 parts |
| 40% strength formaldehyde | 50 parts |

The various components are introduced, whilst stirring, at 20°±1° C. in the order indicated above and the solution thus obtained is kept stirring for 4 hours and 30 minutes at 20° C.±1° C. to ripen. After ripening, 2.3 parts of sodium hydroxide are added.

Separately, a latex solution B consisting of:

| | |
|---|---|
| softened water | 292 parts |
| 60% strength natural latex | 428 parts |
| 40% strength latex based on vinyl-pyridine | 640 parts | is prepared whilst stirring at 20° C.±1° C.

Solution A is then poured into solution B whilst stirring at ambient temperature and the solution thus obtained is left to stand for 24 hours. The pH of the adhesive-coating bath thus prepared is 9.6.

Such an adhesive-coating bath possesses good mechanical stability; that is to say, no coagulation of the bath takes place, especially when the glass fibers are passing over the draining roller, the latter being provided with a wiper blade to remove the excess bath.

In contrast, a substantial change of the viscosity as a function of time is observed.

| Ageing time in days | 2 | 5 | 8 | 11 | 14 |
|---|---|---|---|---|---|
| Viscosity in centipoises | 40 | 106 | 148 | 205 | 235 |

This adhesive-coating composition is used in the 24 hours following the ripening in order to impregnate a bundle of glass filaments of total gauge 3400 dtex by means of a vibrating device; the fibers are then drained by means of a roller impregnated with adhesive-coating bath and provided with a wiper blade to remove the excess bath, the roller revolving at a speed of 40 rpm. The draining makes it possible to render uniform the layer of adhesive-coating.

The bundle is then dried at a temperature of 270° C. by passing same continuously through a 12 meters-long tube at a speed of 30 m/minute, after which the adhesive-coating composition is crosslinked in a second tube 12 meters long kept at 270° C.

The glass filaments thus adhesive-coated are then wound up and doubled (100 turns/minutes, Z twist).

They have the following characteristics:

| | | |
|---|---|---|
| Adhesion test | (kg/5 mm) 9.0 | (mean of 20 measurements) |
| Mallory test | 2,200 kilocycles | (mean of 8 measurements) |
| Breaking load | 34 kg | (mean of 10 measurements) |

EXAMPLE 3

A resin solution A containing the following is prepared:

| | |
|---|---|
| softened water | 433 parts |
| resorcinol | 36.6 parts |
| sodium hydroxide | 1.03 parts |
| 40% strength formaldehyde | 50 parts |

The various components are introduced whilst stirring at 20° C.±1° C. in the order indicated and the solution thus obtained is kept stirring for 4 hours and 30 minutes at 20° C.±2° C. to ripen.

After this period of time, 2.3 parts of sodium hydroxide are added.

Separately, a latex solution C consisting of:

| softened water | 292 parts |
| --- | --- |
| 60% strength natural latex | 428 parts |
| 28% strength ammonium hydroxide | 5.3 parts |
| latex based on vinylpyridine | 640 parts | is prepared whilst stirring at 20° C.±2° C.

Solution A is then poured into solution C whilst stirring at ambient temperature and the solution thus obtained is left standing for 24 hours. Such an adhesive-coating bath possesses good mechanical stability; that is to say, it does not coagulate on the draining roller, and shows excellent stability of its viscosity in respect of ageing, as is shown by the following table:

| Period of ageing in days | 0 | 3 | 10 |
| --- | --- | --- | --- |
| Viscosity in centipoises | 7.4 | 8.3 | 12.1 |

The bundle of glass filaments is heated as in the preceding example.

It has the following mechanical characteristics:

| Mallory test | 2,200 kilocycles | (mean of 8 measurements) |
| --- | --- | --- |
| Adhesion test H | 9.0 kg/5 mm | (mean of 20 measurements) |
| Breaking load | 34.0 kg | (mean of 10 measurements) |

It is found that the absence of variation of the viscosity in the course of a period of ageing results in very great constancy of the amount of bath deposited on the bundle of glass filaments. This constancy results in turn in making the characteristics of the bundle homogeneous.

Furthermore, the absence of variation of the viscosity during ageing makes it possible to store this adhesive-coating bath for longer than the bath according to Example 2.

In fact, this bath can be used for 10 days or even 15 days after its preparation because its viscosity has only changed to 12.1 centipoises after 10 days as against 40 centipoises after 2 days, and 205.0 centipoises after 11 days in the case of Example 2.

The cords of glass fibers prepared according to the present invention are of great value for all applications in the rubber industry and in particular in the manufacture of tires, conveyors, conveyor belts, hoses and the like.

What is claimed is:

1. A process for adhesive-coating glass fibers, characterised in that the glass fibers are impregnated by means of a composition consisting essentially of a solution A produced from:

| softened water | 433 parts by weight |
| --- | --- |
| resorcinol | 36.6 parts by weight |
| sodium hydroxide | 1 to 3.50 parts by weight |
| 40% strength formaldehyde | 21.3 to 50.0 parts by weight | and a latex solution B consisting essentially of:

| softened water | 0 to 292 parts by weight |
| --- | --- |
| 60% strength natural latex | 213 to 428 parts by weight |
| 40% strength latex based on vinylpyridine | 640 to 960 parts by weight | in which:
the total weight of solids relative to the bath varies between about 30 and 35%;
the formaldehyde/resorcinol molar ratio varies between 0.85 and 2;
the dry weight of latex relative to the resorcinol/formaldehyde resin varies between about 8.5/1 and 11/1;
the final pH is 9.6±0.2; and
the proportion by weight of dry resorcinol/formaldehyde resin relative to the amount of all the products varies between 10 and 12%
and in that the fibers passing through the bath are subjected to vibratory movements communicated directly to the fibers.

2. A process for adhesive-coating for glass fibers as defined in claim 1, wherein the adhesive-coating composition consists essentially of a resin A composed of:

| softened water | 433 parts by weight |
| --- | --- |
| resorcinol | 36.6 parts by weight |
| sodium hydroxide | 1 to 3.50 parts by weight |
| 40% strength formaldehyde | 21.3 to 50.0 parts by weight | and a latex solution C consisting essentially of:

| softened water | 0 to 292 parts by weight |
| --- | --- |
| 60% strength natural latex | 213 to 428 parts by weight |
| ammonium hydroxide | 2.6 to 10.5 parts by weight |
| latex based on vinylpyridine | 640 to 960 parts by weight. |

3. Glass fibers adhesive-coated by means of an adhesive-coating composition as defined in claim 1.

4. Glass fibers adhesive-coated by means of an adhesive-coating composition as defined in claim 2.

* * * * *